United States Patent
Tuin (10) Patent No.: US 9,926,688 B2
(45) Date of Patent: Mar. 27, 2018

(54) CONNECTING UNIT FOR A KITCHEN MIXER TAP AND METHOD FOR PLACING AND CONNECTING SAID UNIT

(71) Applicant: FLOWW B.V., Waardenburg (NL)

(72) Inventor: Tido Willem Tuin, Arnhem (NL)

(73) Assignee: FLOWW B.V., Waardenburg (NL)

( * ) Notice: Subject to any disclaimer, the term of this patent is extended or adjusted under 35 U.S.C. 154(b) by 7 days.

(21) Appl. No.: 14/996,344

(22) Filed: Jan. 15, 2016

(65) Prior Publication Data

US 2016/0208462 A1 Jul. 21, 2016

(30) Foreign Application Priority Data

Jan. 16, 2015 (NL) ..................................... 2014147

(51) Int. Cl.
| | |
|---|---|
| *E03C 1/04* | (2006.01) |
| *F16K 11/00* | (2006.01) |
| *E03C 1/02* | (2006.01) |
| *E03C 1/044* | (2006.01) |
| *F16K 49/00* | (2006.01) |

(52) U.S. Cl.
CPC ................ *E03C 1/02* (2013.01); *E03C 1/021* (2013.01); *E03C 1/04* (2013.01); *E03C 1/044* (2013.01); *F16K 11/00* (2013.01); *F16K 49/00* (2013.01)

(58) Field of Classification Search
CPC ........ E03C 1/021; E03C 1/023; E03C 1/0401; E03C 1/044; F16K 11/00; F16K 49/002
USPC .......................... 4/676, 677; 137/599.14, 607
See application file for complete search history.

(56) References Cited

U.S. PATENT DOCUMENTS

| | | | | | |
|---|---|---|---|---|---|
| 5,363,989 | A | * | 11/1994 | Zeamer ................ | B67D 1/1213 137/382 |
| 5,881,763 | A | * | 3/1999 | Angelos .................. | E03C 1/023 137/340 |
| 6,021,808 | A | * | 2/2000 | Dulac ................... | F24H 9/2035 137/487 |
| 7,299,992 | B1 | * | 11/2007 | Chen ....................... | E03C 1/044 137/599.01 |

(Continued)

FOREIGN PATENT DOCUMENTS

| | | | | |
|---|---|---|---|---|
| EP | 2672027 A1 | * | 12/2013 | ........... E03C 1/0404 |
| WO | 9813635 A1 | | 4/1998 | |
| WO | 2007004050 A1 | | 1/2007 | |

*Primary Examiner* — Seth W Mackay-Smith
(74) *Attorney, Agent, or Firm* — The Webb Law Firm (57) ABSTRACT

The invention relates to a connecting unit for a kitchen mixer tap which is configured to supply cold water, warm water, and water of at least one other type. The connecting unit is provided with a cold water supply connection for supplying cold mains water, a cold water discharge connection for discharging cold water, a warm water discharge connection for discharging warm water, an auxiliary water discharge connection for discharging water of another type to the kitchen mixer tap, an apparatus discharge connection for discharging cold water to be heated to a warm water preparation apparatus, an apparatus supply connection for supplying water coming out of the warm water preparation apparatus, an inlet combination coupled to the apparatus discharge connection, and a mixer element coupled to the warm water discharge connection for mixing cold water and warm water. The connecting unit is configured to be placed under a worktop.

21 Claims, 7 Drawing Sheets

(56) References Cited

U.S. PATENT DOCUMENTS

| | | | |
|---|---|---|---|
| 2004/0079426 A1* | 4/2004 | Hung | E03C 1/0404 137/801 |
| 2009/0211654 A1* | 8/2009 | Nobili | E03C 1/04 137/597 |
| 2012/0227849 A1* | 9/2012 | Rodenbeck | E03C 1/057 137/897 |
| 2014/0001383 A1* | 1/2014 | Staffiere | F16K 31/055 251/129.01 |
| 2014/0060652 A1* | 3/2014 | McHugh, IV | E03B 7/12 137/1 |
| 2014/0189949 A1* | 7/2014 | Kelbassa | E03C 1/023 4/670 |

* cited by examiner

CONNECTING UNIT FOR A KITCHEN MIXER TAP AND METHOD FOR PLACING AND CONNECTING SAID UNIT

CROSS-REFERENCE TO RELATED APPLICATION

This application claims priority to Netherlands Patent Application No. 2014147 filed Jan. 16, 2015, the disclosure of which is hereby incorporated in its entirety by reference.

BACKGROUND OF THE INVENTION

The invention relates to a connecting unit for a kitchen mixer tap. Increasingly, use is being made of water preparation devices for preparing water of another type, such as boiling water, cooled water, filtered water or carbonized water. Multifunctional kitchen mixer taps are therefore known which are configured not only to draw normal cold or warm tap water, but also to draw water of one or more other types. Such a kitchen mixer tap is known from EP-A-2 672 027. Connecting the kitchen mixer tap and the one or more water preparation devices is cumbersome, since a large number of connections have to be made and any auxiliary apparatus, such as an inlet combination for the heating device, must also be connected.

The object of the present invention is to provide means for simplifying the connection of the combination of a kitchen mixer tap which is also suitable for drawing water of at least one other type and a heating device for preparing warm water.

SUMMARY OF THE INVENTION

This object is achieved by a connecting unit for a kitchen mixer tap which is configured to supply cold water, warm water and water of at least one other type, wherein the connecting unit is provided with a cold water supply connection for supplying cold mains water, a cold water discharge connection for discharging cold water to the kitchen mixer tap, an auxiliary water discharge connection for discharging water of another type to the kitchen mixer tap, an apparatus discharge connection for discharging cold water to be heated to a warm water preparation apparatus, an apparatus supply connection for supplying water coming out of the warm water preparation apparatus, an inlet combination of an overpressure valve and a non-return valve which is coupled to the apparatus discharge connection, wherein the connecting unit is configured to be placed under a worktop.

With special preference the connecting unit comprises additionally both:
  a warm water discharge connection for discharging warm water to the kitchen mixer tap; and
  a mixer element coupled to the warm water discharge connection for mixing cold water and warm water.

When installing a combination of a warm water preparation apparatus and a kitchen mixer tap, it is thus only necessary to make the connections mentioned above, which greatly simplifies the connection process and reduces the risk of incorrect connections.

The invention thus also relates to the combination of a connecting unit according to the invention, which is connected to a kitchen mixer tap which is configured to supply cold water, warm water and water of at least one other type.

It should be noted that a connecting and mounting element for washbasins is known, by means of which the installation of a washbasin is simplified, in the form of the 'Monolith'® from Geberit®. This connecting and mounting element is configured, in particular in the case of renovations, to be placed against a wall, thus in view, in order to cover supply and discharge connections and in order to mount a washbasin. In contrast to the current proposal, this device according to the prior art is only configured to couple a cold and warm water connection, so that this does not provide a solution to the problem on which the present proposal is based.

Preferably, the warm water preparation apparatus is a hot water preparation apparatus and the auxiliary water discharge connection is configured to convey boiling water. Since boiling water is desired in many situations, this embodiment meets this desire.

In order to also be able to draw other types of water, the connecting unit is preferably provided with a second apparatus supply connection and a second apparatus discharge connection. An apparatus for preparing warm water will always have to be connected, given the need for warm water in the kitchen. As well as the situation described above, in which water of the other type is formed by boiling water, it is also possible to draw cooled water or carbonized water. The second apparatus discharge connection and the second apparatus supply connection serve to connect a water cooling device or a water carbonization device.

In order to facilitate the connection process, it is preferred for the axes of the connections to extend substantially parallel to one another. As a result, all connections extend in the same direction so that, given suitable placement of the connecting unit, they are all easily accessible and the installation can be connected in a simple manner.

The accessibility of the connections is further improved if the connections are situated substantially on the same connecting plane. Moreover, this makes the connections clearly visible, which further reduces the risk of errors during the connection process.

Although the connecting unit is placed under the worktop, and it are obviously of less importance, the handling and visibility of the connecting unit are improved if the connecting unit is provided with a housing and a wall of the housing extends parallel to the connecting plane. After all, the presence of a wall also offers the opportunity of providing the connections with an indication of their function.

As has already been stated, the connecting unit is preferably placed under the worktop. In order to keep the couplings between the connecting unit and the kitchen mixer tap as short as possible, it is preferred if the connecting unit is placed in the cupboard under the sink. Such cupboards have a rear wall and usually two side walls, onto which the connecting unit can be fastened, whereas the top wall is usually occupied by the sink and is thus not available for fastening the connecting unit. In general, it is attractive for the connecting plane of the connecting unit to be directed forwards, in connection with accessibility. It is possible to meet the abovementioned desires when the connecting unit is provided with a U-shaped mounting bracket which is connectable to the housing outside the connecting plane and when the mounting bracket is configured to mount the housing in a number of different rotational positions about an axis extending through both lugs of the mounting bracket. When the U-shaped bracket is placed with its axis vertically between the lugs, the connecting plane can be directed forwards in the case of mounting both against the rear wall and against either side wall. The connecting plane may also be directed sideways. In the case of placement against the rear wall, the connecting plane can also be directed forwards when the bracket is placed with its axis horizontally, whereas, in the case of placement against one of the side walls, the connecting plane can be directed sideways.

The use of a boiler requires the use of an overpressure valve having an overflow in order to be able to compensate for expansion of the water in the boiler. Such an overpressure valve is preferably accommodated in the connecting unit. In order to be able to discharge the water emerging from the overflow, the connecting unit is preferably also provided with a trap for collecting water emerging from an overflow opening of the overpressure valve, which trap is coupled to a discharge water connection.

The axis of the discharge water connection preferably extends substantially parallel to that of the other connections and the discharge connection is substantially situated on the connecting plane. This simplifies the connection process.

As stated above, the connecting unit can be placed in different positions. In order to allow the trap to operate in a number of these positions, it is preferable for the trap to be configured to function in two positions of the connecting unit which are mutually tilted about a horizontal axis by an angle of 90° and for the trap to be provided with the collecting part extending around the discharge opening of the overpressure valve for collecting water emerging from the overflow opening of the overpressure valve.

The use of a boiler with hard mains water, in particular a boiler which prepares boiling water, can lead to limescale or furring in the boiler tank, which shortens the service life of the boiler. In order to prevent these drawbacks, the connecting unit, according to a preferred embodiment, is provided with a connection for an exchangeable lime filter and the connection is situated on a plane which differs from the connecting plane. In this case, the connecting unit is configured to route mains water initially through the lime filter and subsequently through the boiler, so that the boiler only comes into contact with softened water. Although it is possible to accommodate the lime filter in the housing of the connecting unit, the lime filter is a bulky part and it is preferred for the lime filter to be coupled to the connecting unit outside the housing in order to be able to replace the lime filter easily.

According to an embodiment which is attractive from a construction perspective, one lug of the U-shaped bracket extends at least partially around the connection for the water filter or partially around the water filter.

Although it is possible to provide indications of the functions of the connections, it is preferred for the connections to be of different types. This prevents any confusion. The application of this measure does require the use of connecting pipes or hoses which are provided with relevant couplings.

Kitchen mixer taps of the abovementioned type occur in different configurations; for instance, there are kitchen mixer taps which are actuated in an entirely mechanical manner and which not only comprise a mechanically actuated mixer tap for drawing cold and warm water, but also a mechanically actuated tap for boiling water. There are also kitchen mixer taps which are indeed provided with a mechanically actuated mixer tap for drawing cold and warm water, but which are configured to electrically control an externally arranged electrical valve for boiling water. It is of course possible to provide a separate type of connecting unit for both types of kitchen mixer tap, but a preferred embodiment provides a connecting unit of the abovementioned type which comprises a first connection placed in the housing, which first connection can optionally be provided with a removable stop in order to configure the connecting unit for a kitchen mixer tap which is suitable for drawing boiling water in a mechanically actuable manner, or with a first electrically controllable valve in order to configure the connecting unit for a kitchen mixer tap which is suitable for drawing boiling water in an electrically actuable manner. It is thus possible to use a single type of connecting unit for both types of kitchen mixer tap. It should be noted that the connecting unit can be supplied to the installer or consumer with a stop and with a separate electrical valve, in which case the consumer needs to replace the stop with the electrical valve when using the tap which is actuable in a fully electrical manner. However, since this cancels out part of the advantage of the invention, namely the easy connection process, it is preferred to supply the connecting unit in two different versions. In that case, the advantage of this embodiment emerges in the simplified production and logistics.

This embodiment also provides a combination of such a connecting unit which is provided with a stop and a kitchen mixer tap which is configured to draw boiling water in a mechanically actuable manner.

Another embodiment provides a combination of a connecting unit which is provided with an electrically controllable valve and a kitchen mixer tap which is configured to draw water of another type in an electrically actuable manner.

Yet another embodiment provides a combination of this type, wherein the kitchen tap is configured to draw boiling water.

In principle, it is possible to control the electrically actuable valve directly from the kitchen mixer tap. Modern kitchen mixer taps are usually provided with electronic actuating elements which need to be coupled to the valve via an electronic control circuit. To this end, a preferred embodiment provides a connecting unit which is provided with the first electrically controllable valve and with an electronic control unit which is coupled to the first controllable valve and which is provided with an electrical connection for coupling to the kitchen mixer tap.

The presence of a lime filter, which is primarily intended to reduce the hardness of the water in order to prevent problems in the boiler, offers the possibility of supplying softened water to the kitchen mixer tap. Some kitchen mixer taps comprise an actuating element for drawing softened water. A specific embodiment therefore provides a connecting unit of the abovementioned type, which is provided with a second connection placed in the housing, which second connection can optionally be provided with a removable stop or with a second electrically controllable valve, in order to configure the connecting unit for a kitchen mixer tap which is suitable for drawing filtered cold water in an electrically actuable manner. This measure allows the connecting unit to be configured for a kitchen mixer tap of this type. In this case, too, the connecting unit can be provided with a stop and a separate electrical valve, but it is preferred to supply the connecting unit in the desired embodiment.

According to a further preferred embodiment, the connecting unit is provided with the second electrically controllable valve and the electronic control unit is coupled to the second controllable valve.

This embodiment also provides a combination of a connecting unit which is provided with two electrically actuable valves and a kitchen mixer tap which is configured to draw boiling water and filtered water in an electrically actuable manner.

According to an embodiment explained above, the connecting unit is provided with connections of different types in order to prevent the connections from becoming mixed up. Connections of different types require hose sections or pipe sections which are provided with couplings of different kinds at at least one of their ends. These can be purchased separately by the user, but it is more attractive when they are supplied together with the connecting unit. To this end, a specific embodiment provides a collection of parts, comprising a combination of one of the abovementioned types and sections of pipe or hose which are each configured to be coupled to a different connection of the connecting unit and which are all provided with a different coupling on one side.

The advantages of the invention are also apparent from a method for placing and connecting a connecting unit for a kitchen mixer tap which is configured to supply at least cold, warm and boiling water, comprising placing and fastening the connecting unit under a worktop and subsequently, in any desired order, connecting the water mains to a cold water supply connection of the connecting unit, coupling the cold water connection of the kitchen mixer tap to a cold water discharge connection of the connecting unit, coupling the boiling water connection of the kitchen mixer tap to a boiling water discharge connection of the connecting unit and connecting both connections of a hot water preparation apparatus to an apparatus discharge connection and an apparatus supply connection, respectively, of the connecting unit, and preferably the additional step of coupling the warm water connection of the kitchen mixer tap to a warm water discharge connection of the connecting unit.

For the sake of simplicity, a further embodiment provides a method in which a U-shaped mounting bracket is initially fastened under the worktop, and subsequently a casing of the connecting unit is placed in the desired position in the U-shaped bracket.

Preferably, following the coupling of the connections configured for water, an electrical connection is established between the connecting unit and the kitchen mixer tap.

BRIEF DESCRIPTION OF THE DRAWINGS

The invention will be explained below on the basis of the attached figures, in which.

DETAILED DESCRIPTION OF THE INVENTION

Figure 1:
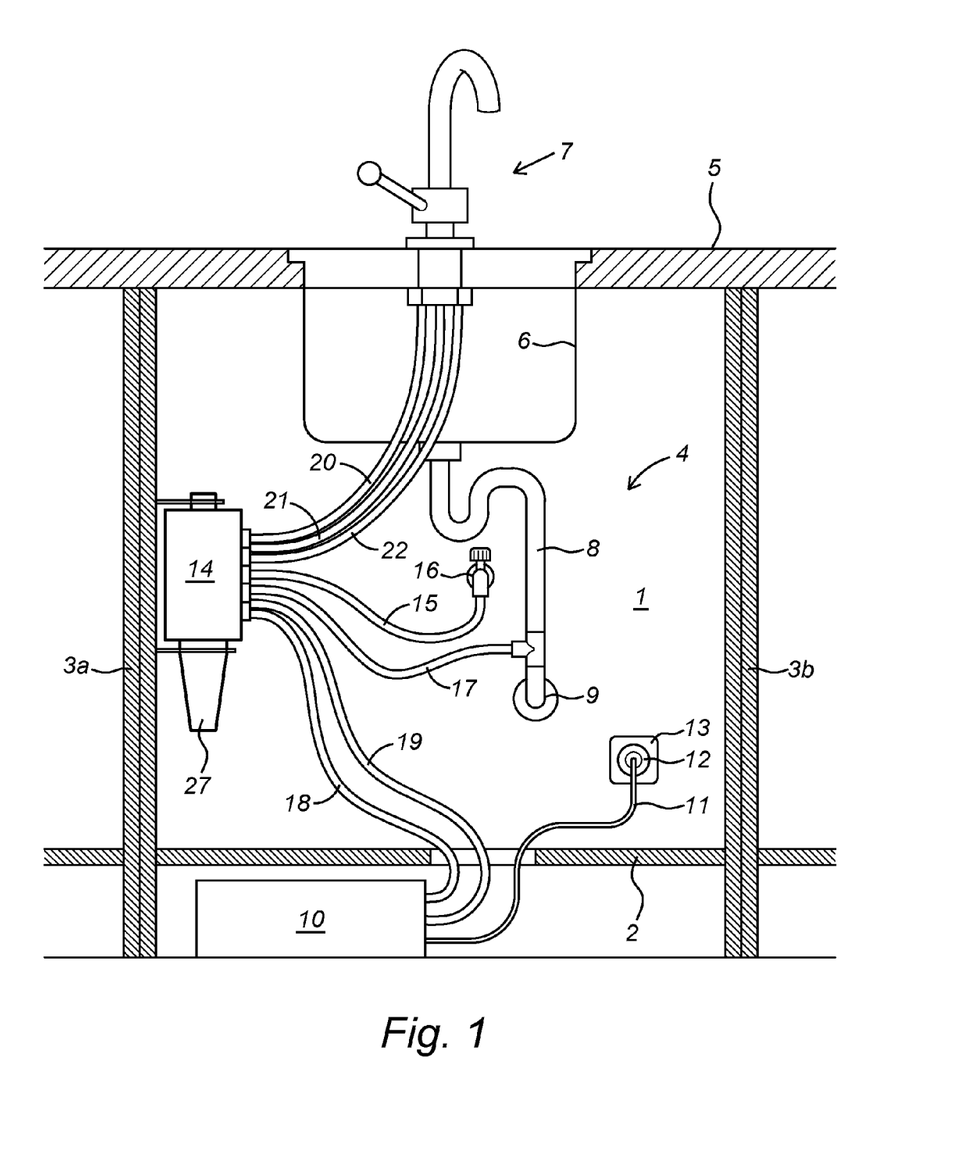
FIG. 1: shows a cross section of a kitchen cupboard, with a kitchen mixer tap, a boiler and a connecting element according to the invention.

FIG. 1 shows a kitchen cupboard 1 which is provided with a base 2 and two side walls 3a and 3b, respectively, and a rear wall 4. At its top, the kitchen cupboard is delimited by a worktop 5 and at its front the kitchen cupboard is provided with doors (not illustrated). A recess is made in the worktop 5 in which a sink 6 is arranged. A kitchen mixer tap 7 is placed in the worktop 5 behind the sink 6. The sink is coupled to the sewage connection 9 by means of a drainpipe 8. A boiler 10 is placed under the base 2, which boiler is configured to prepare boiling water. The boiler 10 is coupled to a wall socket 13 by means of a lead 11 and a plug 12. The structure described above is known per se.

In order to simplify the connection of the kitchen mixer tap 7, a connecting unit 14 according to the invention is placed against the wall 3a. The connecting unit 14 is coupled to a stopcock 16 of a mains water connection by means of a flexible pipe 15 and is coupled to the drainpipe 8 by means of a flexible pipe 17. The connecting unit is also coupled to the boiler 10 by means of two flexible pipes 18, 19 and the connecting unit 14 is coupled to the kitchen mixer tap 7 by means of three flexible pipes 20, 21 and 22.

Figure 2:
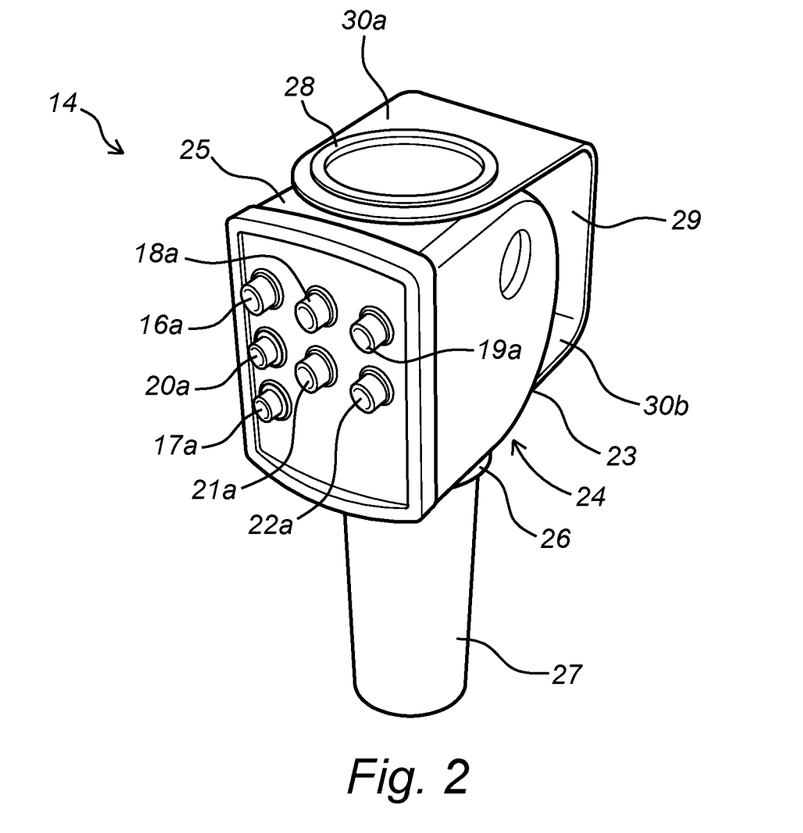
FIG. 2: shows a perspective view of a connecting unit according to the invention.
Figure 3A:
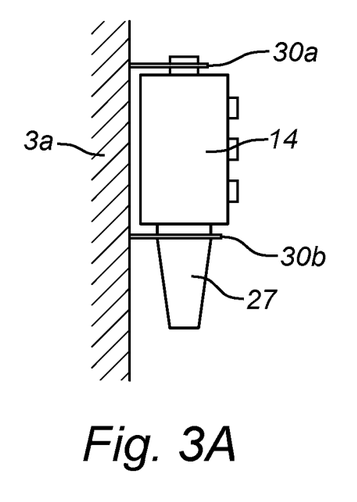
FIGS. 3A-3D: show diagrammatic views of various mounting positions of the device according to the invention.
Figure 3B:
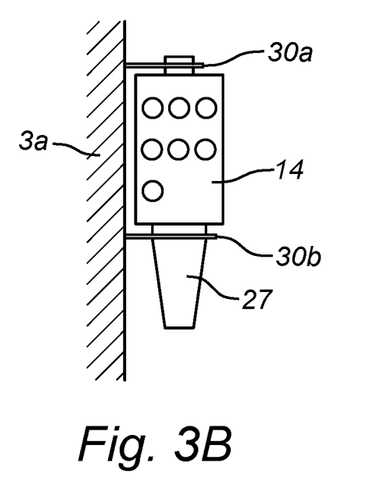
Figure 3C:
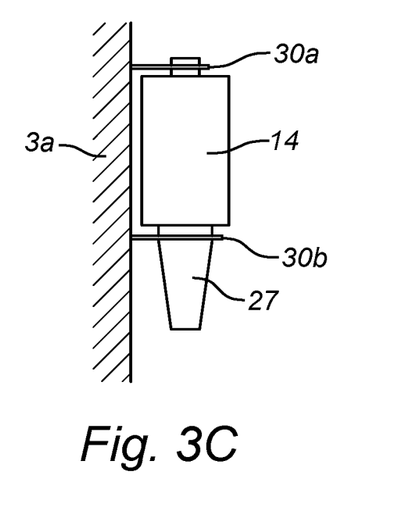
Figure 3D:
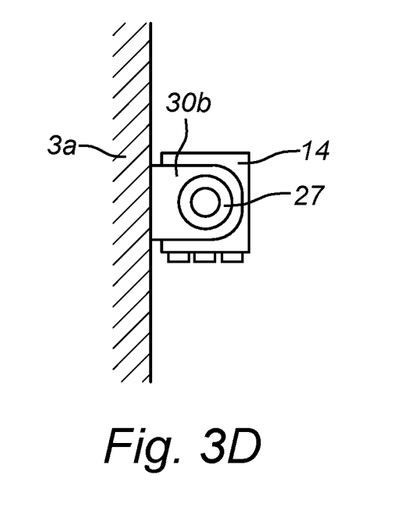

As can be seen in FIG. 2, the connecting unit 14 comprises a housing with, inter alia, a connecting wall 23, a filter wall 24 and an end wall 25. The filter wall 24 is provided with a bayonet connection 26 for coupling a water filter 27 and the end wall 25 is provided with a round protrusion 28. In order to mount the unit, use is made of a bracket 29 which is to be fastened against a wall and has two lugs 30a, 30b which extend around the bayonet connection 26 and the protrusion 28. The connecting wall 23 is provided with connections 15a, 17a, 18a, 19a, 20a, 21a and 22a for connecting to the relevant pipes. The connections are all of different types, such as provided with a different diameter or a different type of coupling. The different types of coupling are preferably chosen so that they can be made using simple tools, such as screwed connections with coupling nuts or compression connections.

The connecting unit 14 can be placed against a wall of a kitchen cupboard in various ways, as is illustrated in FIG. 3. When selecting the position of the connecting unit 14, it is possible to take into account the available space and the accessibility of the connecting wall 23. For instance, it is possible to mount the connecting unit 14 with the filter pointing downwards, as shown in FIGS. 3A, 3B and 3C. All three configurations are possible when the connecting unit is placed against the rear wall of the kitchen cupboard, but when the connecting unit is placed against a side wall of the kitchen cupboard only the configuration from FIG. 3B is possible. It is also possible, as shown in FIG. 3D, to place the connecting unit with the filter wall pointing downwards.

The connecting unit can be used in at least four configurations, illustrated in FIGS. 4A, 4B, 4C and 4D, namely for a kitchen mixer tap with a mechanical tap for boiling water, for a kitchen mixer tap with electrical actuation for drawing boiling water, for a kitchen mixer tap which is configured to also draw cold filtered water and for a kitchen mixer tap which is also configured to draw cooled water. All of these configurations can be connected with the same configuration of pipes.

Figure 4A:
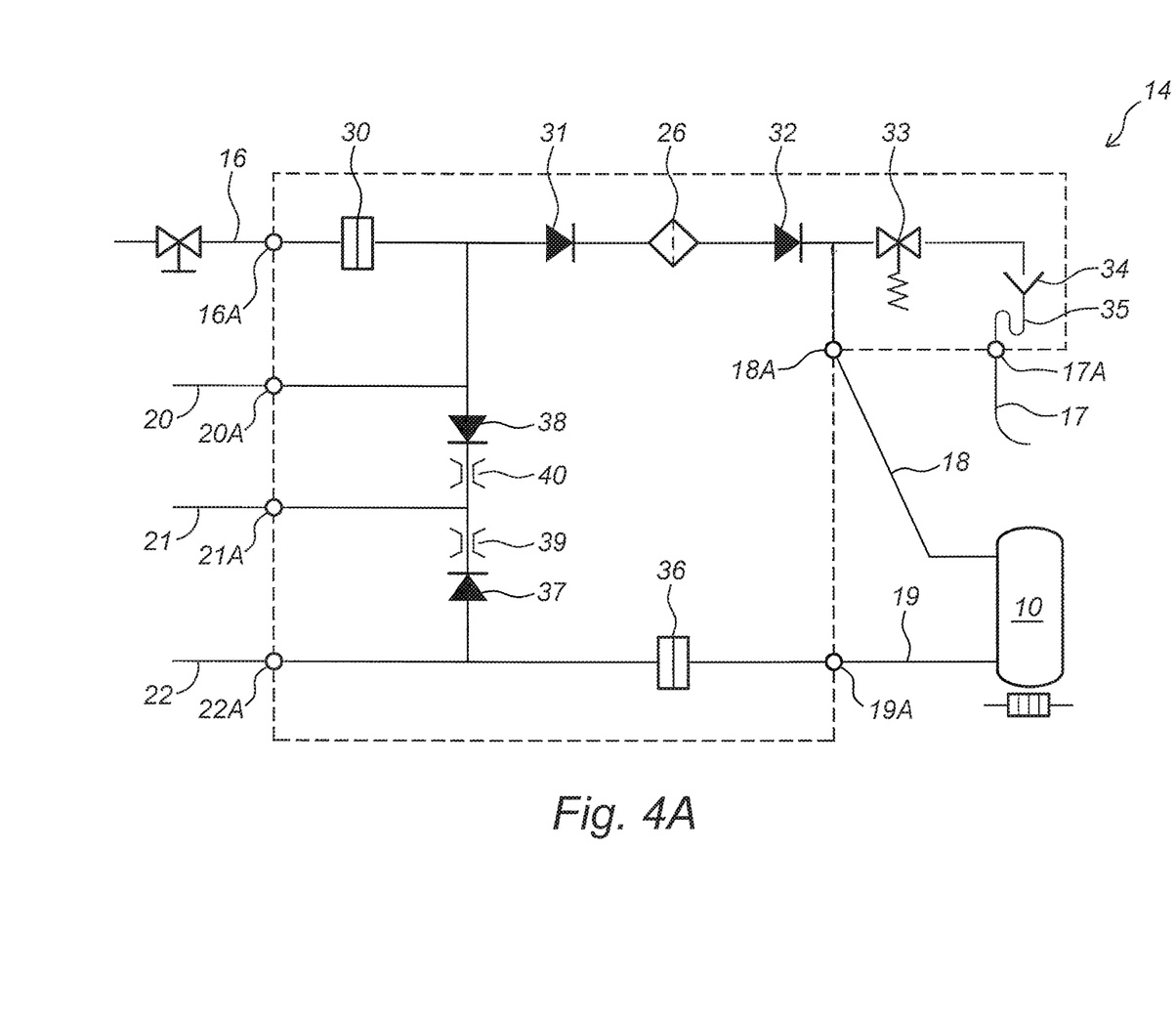
FIGS. 4A-4D: show diagrams of various embodiments of the device according to the invention.

The configuration illustrated in FIG. 4A is configured to be coupled to a kitchen mixer tap with a mechanical tap for boiling water. This connecting unit comprises a non-return valve 31 coupled to the cold water supply connection 16A, which non-return valve is coupled to the bayonet connection 26 for the filter 27. If the stopcock 16 is not provided with a screen, a filter screen is preferably arranged between the connection 16A and the non-return valve 31. The other side of the bayonet connection is coupled to a following non-return valve 32, the other side of which is coupled to an overpressure valve 33 and to the apparatus discharge connection 18a. The latter non-return valve 32 and the overpressure valve 33 together perform the function of a so-called inlet combination. The overpressure valve 33 is provided with an overflow 34 which is coupled to a discharge water connection 17A via a trap 35.

The apparatus supply connection 19A is coupled to the boiling water discharge connection 22A via a filter screen 36. The parts described above form the circuit for providing boiling water. In order to provide cold water, a cold water discharge connection 20A is provided which is coupled to the connection between the filter screen 30 and the non-return valve 31. In order to provide warm water, a connection is made between the boiling water discharge connection 22A and the cold water discharge connection 20A, in which two non-return valves 37, 38 are connected in anti-series. Two restrictions 39, 40 are arranged between these non-return valves, which restrictions form a mixer device, and a warm water discharge connection 21A is coupled between these restrictions.

Figure 4B:
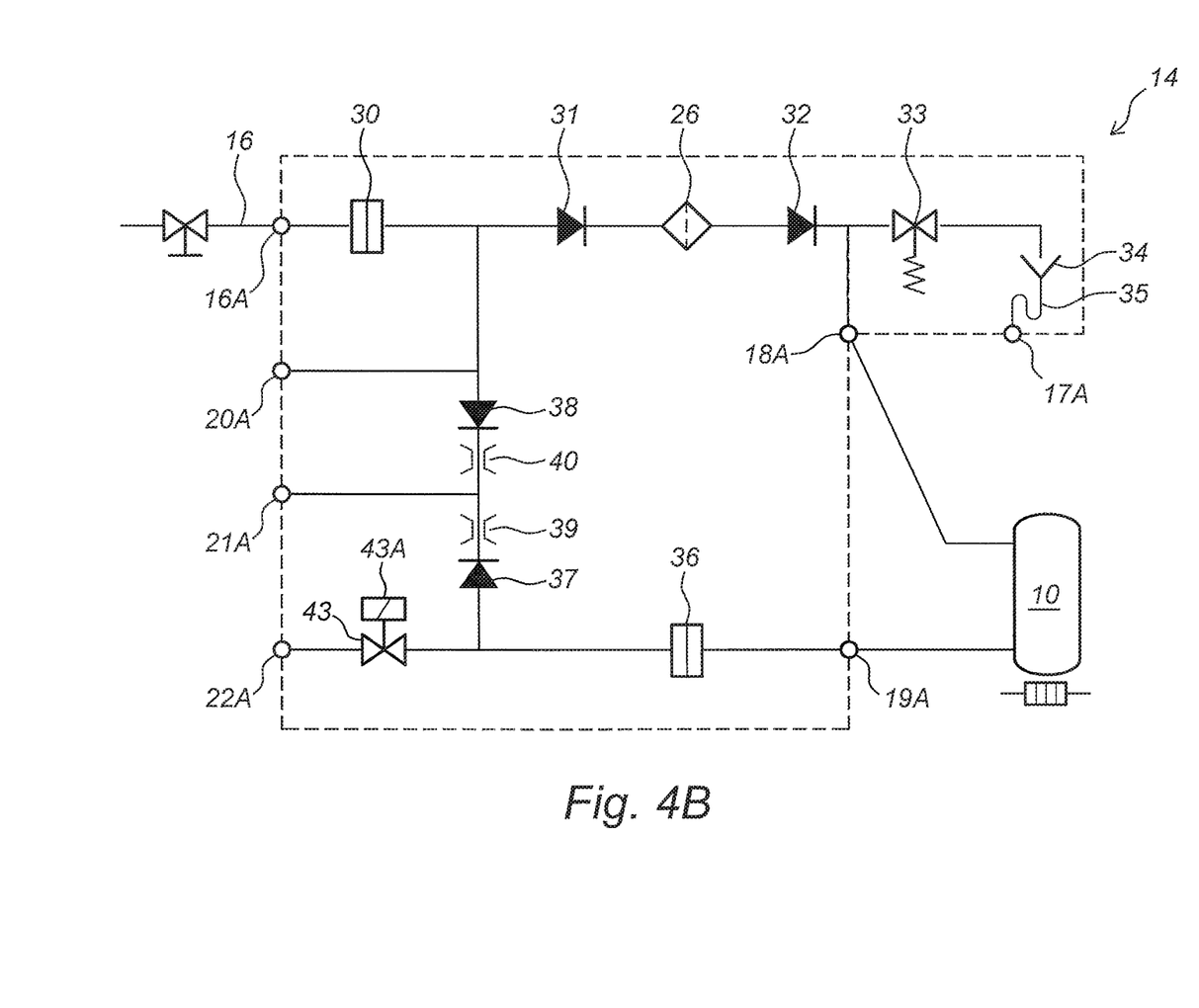

In the embodiment described above, the flow of boiling water is regulated by a mechanical shut-off valve which is accommodated in the kitchen mixer tap. The connecting unit illustrated in FIG. 4B is provided for kitchen mixer taps which lack such a shut-off valve but which are provided with an actuating element for an external shut-off valve for hot water. This largely corresponds with the connecting unit illustrated in FIG. 4A, with an electrically actuable shut-off valve 43 being placed between the filter screen 36 and the boiling water discharge connection 22A. The drive coil 43A of the shut-off valve 43 is coupled to a control circuit, which is not illustrated in the figure but which is coupled to an actuating element of the kitchen mixer tap 7.

Figure 4C:
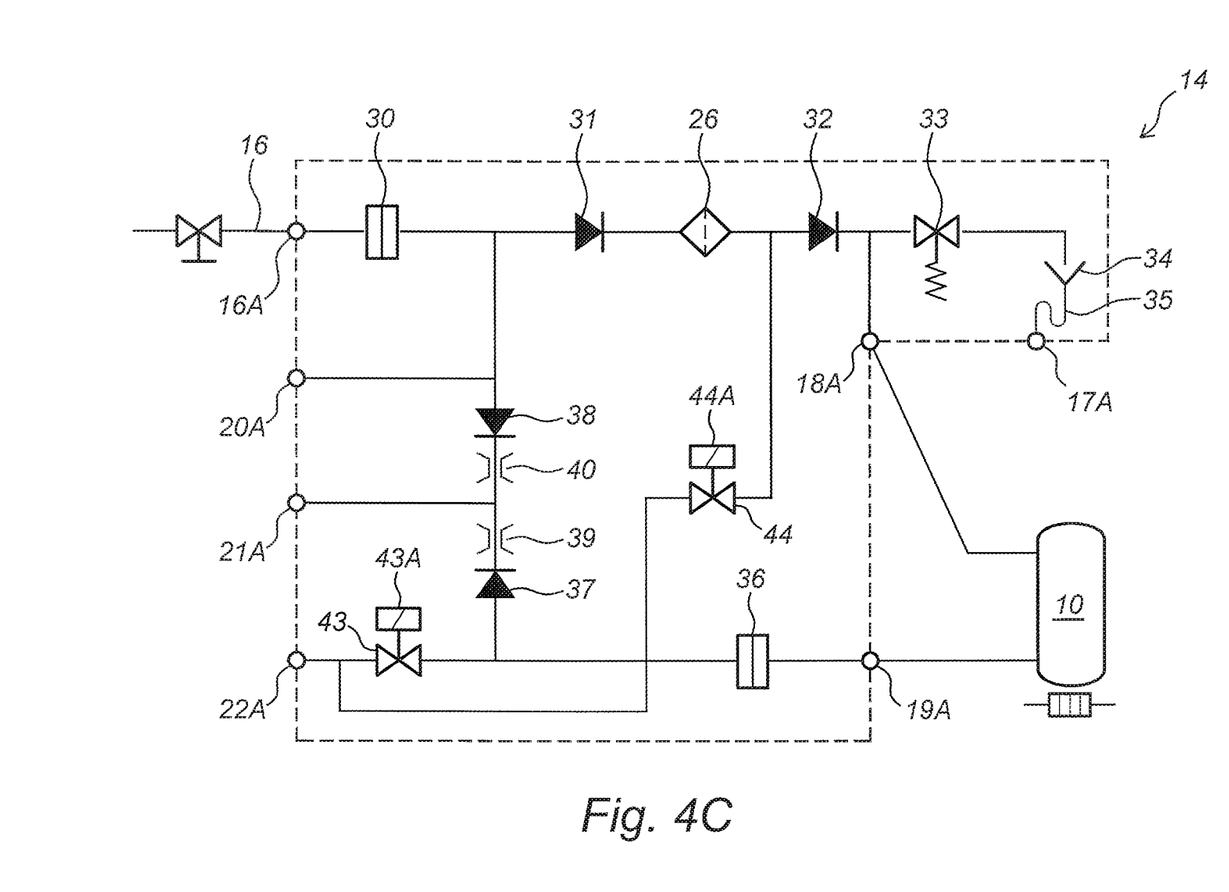
Figure 4D:
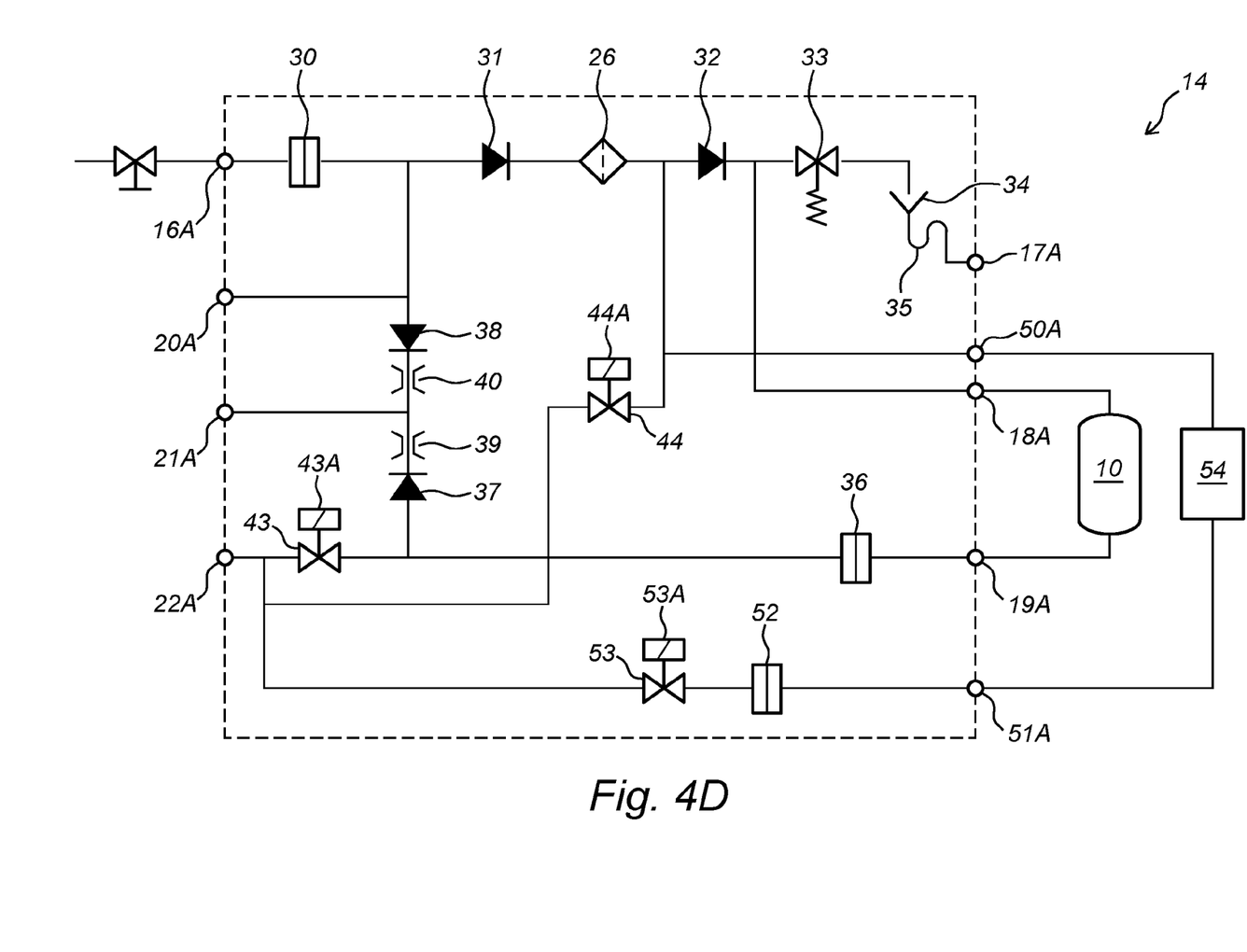

The presence of a filter 27 makes it possible to draw filtered water, for example in order to prepare cold beverages. FIG. 4C illustrates an embodiment of a connecting unit 14 which is configured for this purpose. This embodiment corresponds with the embodiment illustrated in FIG. 4B, with the connection between the non-return valve 32, the overpressure valve 33 and the apparatus discharge connection 18a being coupled to the boiling water discharge connection 22a by means of a controllable shut-off valve 44. The drive coil 44A of the shut-off valve 44 is coupled to a control circuit, which is not illustrated in the figure but which is coupled to an actuating element of the relevant kitchen mixer tap 8.

The embodiments above are all configured to draw cold, warm, boiling and filtered water. In order to also be able to draw other types of water, such as cooled water, the invention provides the embodiment of FIG. 4D. The embodiment of FIG. 4D differs from the embodiment of FIG. 4C in the addition of a second apparatus discharge connection 50A and a second apparatus supply connection 51A, which is coupled to the coupling between the bayonet connection 26 and the non-return valve 32. A second apparatus, such as a water cooling device 54, is connected between the two connections 50A and 51A. However, a water carbonization device (not illustrated) may also be connected. The second apparatus supply connection 51A is coupled to a screen filter 52 and subsequently to an electrically controllable valve 53 which is provided with a control coil 53A. The other side of the electrically controllable valve is coupled to the boiling water discharge connection 22A. It will be clear that cooled water can be drawn by operating the valve 53. The tap of course needs to be configured for this purpose by the presence of an actuating element, such as is otherwise known from EP-A-2 672 027 which was already mentioned above. The above-described addition of the parts 50A, 51A, 52, 53, 53A to the embodiment of FIG. 4C can likewise be applied to the embodiment of FIG. 4B and, following the necessary adjustments, also to the embodiment of FIG. 4A.

The measures from the various embodiments can be combined with one another and the illustrated embodiments can be varied within the scope of the invention as defined in the attached claims.

In particular, it is also part of the invention that the connecting unit is not provided with both:

a warm water discharge connection for discharging warm water to the kitchen mixer tap; and
a mixer element coupled to the warm water discharge connection for mixing cold water and warm water.

This should be understood as omitting in the FIGS. 4A-D, the piping 21 and the connection 21A, as well as the mixer element constituted by the parts 37,38,39,40. Also, the piping on which the mixer element is situated is omitted, i.e. the piping that connects the piping for cold water 20 with the piping for boiling water 22.

The invention claimed is:

1. A connecting unit for a kitchen mixer tap, which kitchen mixer tap is configured to supply cold water, warm water and water of at least one other type, wherein the connecting unit comprises:
   a cold water supply connection for supplying cold mains water;
   a cold water discharge connection for discharging cold water to the kitchen mixer tap;
   an auxiliary water discharge connection for discharging water of another type to the kitchen mixer tap;
   an apparatus discharge connection for discharging cold water to be heated to a warm water preparation apparatus;
   an apparatus supply connection for supplying water coming out of the warm water preparation apparatus;
   a combination of an overpressure valve and a non-return valve which is coupled to the apparatus discharge connection; and
   wherein the connecting unit is configured to be placed under a worktop, and wherein the connecting unit additionally comprises both:
   a warm water discharge connection for discharging warm water to the kitchen mixer tap; and
   a mixer element coupled to the warm water discharge connection for mixing cold water and warm water,
   wherein the connecting unit is provided with a trap for collecting water emerging from an overflow opening of the overpressure valve, which trap is coupled to a discharge water connection.

2. The connecting unit according to claim 1, wherein the warm water preparation apparatus is adapted to be a hot water preparation apparatus and wherein the auxiliary water discharge connection is configured to convey boiling water.

3. The connecting unit according to claim 1, wherein the connecting unit is provided with a second apparatus supply connection and with a second apparatus discharge connection.

4. The connecting unit according to claim 1, wherein the axes of the connections extend substantially parallel to one another.

5. The connecting unit according to claim 4, wherein the connections are situated substantially on the same connecting plane.

6. The connecting unit according to claim 5, wherein the connecting unit is provided with a housing which is provided with a connecting wall which extends parallel to the connecting plane and on which the connections are arranged.

7. The connecting unit according to claim 6, wherein the connecting unit is provided with a U-shaped mounting bracket which is connectable to the housing outside the connecting plane and wherein the mounting bracket is configured to mount the housing in a number of different rotational positions about an axis extending through lugs of the mounting bracket.

8. The connecting unit according to claim 5, wherein the connecting unit is provided with a connection for an exchangeable lime filter, and wherein the connection is situated on a plane which differs from the connecting plane.

9. The connecting unit according to claim 8, wherein one lug of the U-shaped bracket extends at least partially around the connection for the lime filter or partially around the lime filter.

10. The connecting unit according to claim 1, wherein the axis of the discharge water connection extends substantially parallel to that of the other connections and wherein the discharge connection is placed in a connecting wall.

11. The connecting unit according to claim 1, wherein the trap is configured to function in different positions of the connecting unit, tilted about a horizontal axis by an angle of 90°, and wherein the trap is provided with a collecting part extending around the discharge opening of the overpressure valve for collecting water emerging from the overflow opening of the overpressure valve.

12. The connecting unit according to claim 1, wherein the connections are of different types.

13. The connecting unit according to claim 1, wherein the connecting unit is provided with a first connection placed in the housing, which first connection can optionally be provided with a removable stop in order to configure the connecting unit for the kitchen mixer tap which is suitable for drawing boiling water in a mechanically actuable manner, or with a first electrically controllable valve in order to configure the connecting unit for the kitchen mixer tap which is suitable for drawing boiling water in an electrically actuable manner.

14. The connecting unit according to claim 13, when this is provided with the first electrically controllable valve, wherein a connecting unit is provided with an electronic control unit which is coupled to the first controllable valve and which is provided with an electrical connection for coupling to the kitchen mixer tap.

15. The combination of a connecting unit according to claim 14 with the kitchen mixer tap which is configured to draw boiling water and water of another type in an electrically actuable manner.

16. The connecting unit according to claim 13, wherein the connecting unit is provided with a second connection placed in the housing, which second connection can optionally be provided with a removable stop or with a second electrically controllable valve, in order to configure the connecting unit for the kitchen mixer tap which is suitable for drawing filtered cold water in an electrically actuable manner.

17. The connecting unit according to claim 16, when this is provided with the second electrically controllable valve, wherein an electronic control unit is coupled to the second controllable valve.

18. The combination of a connecting unit according to claim 16 with the kitchen mixer tap which is configured to draw water of another type in an electrically actuable manner.

19. The combination according to claim 18, wherein the kitchen tap is configured to draw boiling water.

20. The combination of a connecting unit according to claim 13 with a stop and the kitchen mixer tap which is configured to draw boiling water in a mechanically actuable manner.

21. A collection of parts, comprising a combination according to claim 20, wherein the collection of parts is provided with sections of pipe or hose which are each configured to be coupled to a different connection of the connecting unit and which are all provided with a different coupling on one side.

* * * * *